United States Patent [19]

Crockatt et al.

[11] 4,450,247
[45] May 22, 1984

[54] AIR DRYING COATINGS HAVING LONG TERM WATER REPELLENCY

[75] Inventors: William B. Crockatt, Mississauga; John Rimma, Scarborough, both of Canada

[73] Assignee: DeSoto, Inc., Des Plaines, Ill.

[21] Appl. No.: 368,136

[22] Filed: Apr. 14, 1982

[51] Int. Cl.$^3$ ............................................. C08L 91/08
[52] U.S. Cl. ..................................... 523/518; 524/489
[58] Field of Search ................ 523/518; 524/476, 487, 524/489

[56] References Cited

U.S. PATENT DOCUMENTS 2,294,651 9/1942 Billing .................................. 523/518
2,541,505 2/1951 Curado ................................ 524/476
2,748,092 5/1956 Daniel .................................. 523/518

Primary Examiner—Paul R. Michl
Attorney, Agent, or Firm—Dressler, Goldsmith, Shore, Sutker & Milnamow, Ltd.

[57] ABSTRACT

An air drying coating adapted to deposit coatings possessing long term water repellency is disclosed in which a high viscosity unsaturated hydroxy functional alkyd resin is combined with from 13–63 parts by weight of dispersed particles of granulated wax per 100 parts of the alkyd resin, the solvent being mineral spirits which cannot itself dissolve the large amount of wax needed, and the wax being a paraffin wax having an average melting point in the range of 50° C.–70° C., preferably 55° C.–65° C.

9 Claims, No Drawings

AIR DRYING COATINGS HAVING LONG TERM WATER REPELLENCY

DESCRIPTION

1. Technical Field

This invention relates to air drying coatings which provide long term water repellency for the protection of wood substrates intended to withstand exterior exposure. The coating of unsealed wood, such as cedar, is particularly contemplated.

2. Background Art

Wood of various type is a common and attractive building material, but it degrades on long term exposure to the elements. It is common to paint the wood, but even painted wood degrades because the coatings do not adequately repel water for a long period of time. This invention is concerned with the problem of providing a coating with long term water repellency.

It is known that the presence of wax in a coating provides water repellency. In the prior use of wax, it was melted and dissolved in an organic solvent and incorporated into the organic solvent solution coating composition as a solution. Only a small proportion of wax can be incorporated in this fashion, and larger amounts of wax are needed to extend the duration of the desired water repellency.

3. Disclosure of Invention

In accordance with this invention, a low solids content solution of a high viscosity unsaturated alkyd resin in mineral spirits solution has incorporated therein about 13-63 parts by weight per 100 parts of alkyd resin solids of a granulated paraffin wax. This wax should have an average melting point in the range of 50° C.–70° C., preferably 55° C.–65° C. Preferred proportions are from 53-63 parts of wax on the same basis.

The wax granules in such large amount are not soluble in mineral spirits, but they do dissolve in the alkyd solution using high speed mixing which raises the temperature as mixing proceeds.

Other components which are customarily present in air dry alkyd paints may also be added, such as bodying agents, suspending agents, surfactants, driers, anti-oxidants, and the like, but the essential components are the solvents, the unsaturated alkyd of the character described, and the large proportion of wax granules.

The coatings can be used clear or pigmented, but normally a pigment will be incorporated to produce a degree of opacity or semi-transparency, as desired. This is well known in the painting of wood.

The coating of this invention can be applied in various ways, typically by brush, and the applied coatings are air dried. As is well known, the unsaturated alkyd cures slowly by exposure to atmospheric oxygen, and driers, such as cobalt naphthenate, may be present to speed the cure, as is conventional.

Unsealed wood, particularly cedar, is especially contemplated as the substrate to be coated.

The alkyd resins which are useful herein are oil modified hydroxy-functional polyesters. As is well known, polyesters are formed by the polyesterification of polycarboxylic acids with polyhydric alcohols, and an hydroxyl excess over carboxyl of from 10% to 40% is contemplated herein. To provide the desired high viscosity at low solids content, at least 50% of the hydroxy functionality is provided by a polyhydric alcohol containing at least three hydroxyl groups per molecule, such as trimethylol propane or, preferably, pentaerythritol.

When the polyester is oil modified, as it is herein, it is known as an alkyd resin. At least 35% of the weight of the alkyd is constituted by oil or fatty acid derived therefrom. Oil selection herein is conventional, so all the drying and semi-drying oils and fatty acids contained therein are useful herein. Soybean oil is a typical drying oil and will be used as illustrative herein. A 47% by weight soybean oil alkyd in which the polyester contains 157 parts of pentaerythritol, 73.2 parts of ethylene glycol, 389 parts of phthalic anhydride and 11.2 parts of maleic anhydride will be used in the accompanying example. This alkyd is cooked to an acid value of less than 30, preferably less than 20, and it is provided as a 31% solution in mineral spirits.

The solvent used herein may be regular or odorless mineral spirits, the former for cooking the alkyd and the latter for diluting it. A small amount of alcohol may be used to help suspend the clay.

The invention is illustrated in the examples which follow, all parts being by weight unless otherwise stated.

EXAMPLE 1

560 parts of soybean oil and 108 parts of pentaerythritol are heated to 200° C. and then 0.52 part of zinc acetate is added and the temperature is increased to 250° C.–260° C. and this temperature is maintained until a clear pill is formed when a sample is cooled, which occurs after about 3 hours. The product is then cooled to about 170° C. and the following mixture is added.

| | |
|---|---|
| pentaerythritol | 49.2 parts |
| ethylene glycol | 73.2 parts |
| phthalic anhydride | 389 parts |
| maleic anhydride | 11.2 parts |
| triphenyl phosphite | 0.7 parts |

After the mixture is added, the temperature is raised to 180° C. and held for 2 hours. Then 20 parts of xylol are added and the mixture is refluxed while removing water until the acid value is about 15. As the reaction proceeds, the refluxing temperature slowly increases and is about 235° C. at the end of the run. The completed alkyd resin is then cooled and 2550 parts of mineral spirits are mixed in to provide a solution having a solids content of 31.2% and a Gardner viscosity of S. The final acid value was 18.2. This alkyd resin has an hydroxy excess over carboxyl of 27%.

EXAMPLE 2

An air drying coating is made from the following components.

| | Parts | Component |
|---|---|---|
| 1 | 373 | soya alkyd (solution of Example 1) |
| 2 | 6 | ethanol |
| 3 | 17 | Bentone clay (suspending aid) |
| 4 | 14 | odorless mineral spirits |
| 5 | 10 | attapulgate clay |

-continued

| Parts | | Component |
|---|---|---|
| 6 | 4 | nonionic surfactant |
| 7 | 62 | granulated wax (average diameter less than 1 mm) [see note 1] |

Note 1:
The granulated wax used is a paraffin wax having a melting range of 56° C. to 58° C. (average melting point = 57° C. It would be desirable to have the particle size as small as possible, but these waxes are soft and fine particle size is difficult to maintain. A commercial granulated paraffin wax RPW 1236 from International Wax may be used.

Components 3, 4 and 5 are premixed and then dispersed in the remaining components using high speed mixing. The temperature rise during mixing is held to 40° C. to dissolve the wax in the solution.

In the above illustrative system, at least about 15 parts of granulated wax should be used. It is desired to incorporate as much wax as possible without encountering a major change in viscosity. 60-70 parts of granulated wax in this formulation represents preferred practice since higher amounts causes an excessive viscosity to result.

The nonionic surfactant used in this example is an ethoxylated nonyl phenol containing about 20 ethylene oxide groups per molecule, but the surfactant selection is not critical.

The oil or fatty acid used may be saturated if sufficient ethylenic unsaturation for drying is present, as by the use of larger amounts of maleic anhydride. The use of drying and semi-drying oils is preferred.

It will be apparent that the large proportion of pentaerythritol produces a highly cross-linked alkyd resin which is the factor which leads to high viscosity in solutions containing a small proportion of dissolved resin. Thus, and with respect to a 30% solids content solution of the alkyd in regular mineral spirits (which provides a convenient way to measure solution viscosity), the term "high viscosity" denotes a Gardner viscosity of at least R and most usually from S to U.

The increase in temperature during mixing helps to bring the wax into solution, so it is desirable to have the temperature reach at least about 35° C. Above about 40° C. the solvents become more volatile which increases the hazard to health and safety. Therefore, mixing is preferably carried out to increase the temperature of the mixture to the range of about 35° C. to about 40° C.

What is claimed is:

1. An air drying coating adapted to deposit coatings possessing long term water repellency comprising, a solution of high viscosity unsaturated hydroxy functional oil-modified alkyd resin in mineral spirits, and from 13-63 parts by weight of dissolved paraffin wax having an average melting point in the range of 50° C. to 70° C. per 100 parts of said alkyd resin, said wax being incorporated by adding granules of said wax having an average diameter of less than 1 mm to said alkyd resin solution and vigorously agitating the mixture to increase the temperature to at least about 35° C.

2. A coating as recited in claim 1 in which said coating is clear.

3. A coating as recited in claim 1 in which said coating contains pigments.

4. A coating as recited in claim 1 in which said wax has an average melting point in the range of 55° C. to 65° C. and is used in an amount of from 53 to 63 parts by weight per 100 parts of said alkyd.

5. A coating as recited in claims 1 or 4 in which said alkyd resin is an hydroxyl-functional polyester containing at least 35% by weight of oil or oil fatty acid of drying or semi-drying character, and in which the excess of hydroxyl over carboxyl functionality is from 10% to 40%, at least 50% of the hydroxy functionality being provided by a polyhydric alcohol containing at least three hydroxyl groups per molecule, and said alkyd resin is cooked to an acid value of less than 30.

6. A coating as recited in claim 5 in which said polyhydric alcohol is pentaerythritol.

7. A coating as recited in claim 6 in which said oil is soybean oil.

8. A method of forming an air drying coating adapted to deposit a coating possessing long term water repellency comprising, adding granules of paraffin wax having an average diameter less than 1 mm and an average melting point in the range of 50° C. to 70° C. to a solution of high viscosity unsaturated hydroxy functional oil-modified alkyd resin in mineral spirits, said wax being added in an amount of from 13-63 parts by weight per 100 parts of said alkyl resin, and vigorously agitating the mixture to increase the temperature to at least about 35° C. to dissolve said wax.

9. A method as recited in claim 8 in which the temperature which is reached on agitation is limited to about 40° C.

* * * * *